United States Patent [19]

Dumbaugh, Jr.

[11] 4,409,337

[45] Oct. 11, 1983

[54] GLASS ENVELOPES FOR TUNGSTEN-HALOGEN LAMPS

[75] Inventor: William H. Dumbaugh, Jr., Painted Post, N.Y.

[73] Assignee: Corning Glass Works, Corning, N.Y.

[21] Appl. No.: 440,865

[22] Filed: Nov. 12, 1982

[51] Int. Cl.³ .............................................. C03C 3/08
[52] U.S. Cl. .................................................... 501/66
[58] Field of Search ............................ 501/66; 313/221

[56] References Cited

U.S. PATENT DOCUMENTS

| | | | |
|---|---|---|---|
| 3,496,401 | 2/1970 | Dumbaugh, Jr. | 501/66 |
| 3,798,491 | 3/1974 | Malm | 313/221 |
| 3,978,362 | 8/1976 | Dumbaugh, Jr. et al. | 501/70 |
| 4,060,423 | 11/1977 | Thomas | 501/70 |
| 4,255,198 | 3/1981 | Danielson et al. | 501/70 |
| 4,302,250 | 11/1981 | Danielson | 501/70 |

FOREIGN PATENT DOCUMENTS

| | | | |
|---|---|---|---|
| 19850 | 12/1980 | European Pat. Off. | 501/66 |
| 2060602A | 5/1981 | United Kingdom | 501/70 |

*Primary Examiner*—Mark Bell
*Attorney, Agent, or Firm*—C. S. Janes, Jr.

[57] ABSTRACT

This invention is directed to glasses especially suitable for use as envelopes in tungsten-halogen lamps, those glasses exhibiting liquidus temperatures no higher than 1125° C., liquidus viscosities of at least 50,000 poises, coefficients of thermal expansion between about $42\text{--}46 \times 10^{-7}/°C.$, and consisting essentially, in weight percent on the oxide basis of $SiO_2$—56–59
$Al_2O_3$—16–17
$B_2O_3$—4.5–5.25
$CaO$—7.5–9.25
$MgO$—5.5–6.25
$BaO$—5–9

4 Claims, No Drawings

GLASS ENVELOPES FOR TUNGSTEN-HALOGEN LAMPS

BACKGROUND OF THE INVENTION

Tungsten-halogen lamps have been employed in the European automotive industry for a number of years and have begun to penetrate the automotive market in the United States in recent years. Such lamps demonstrate at least four practical advantages, when compared with sealed beam lamps conventionally utilized in the automotive industry: (1) the light emitted is whiter; (2) the lamp can be much smaller in dimensions than the conventional lamp while producing an equivalent or even greater amount of light; (3) the intensity of the illumination remains virtually constant throughout the life of the lamp; and (4) the lamp exhibits a significantly longer working life than the conventional incandescent lamp.

Nevertheless, because tungsten-halogen lamps operate at much higher temperatures than the standard incandescent lamp, glasses useful as envelopes for such lamps must be thermally stable and resist dimensional deformation at those temperatures. Envelopes have been prepared from fused quartz and 96% silica glass compositions inasmuch as those materials possess strain points and thermal stabilities for in excess of the lamp operating temperatures. Disadvantageously, however, those glasses are quite difficult to form and lampwork and, because of their very low coefficients of thermal expansion, require special sealing techniques to introduce the lead wires into the lamps.

Consequently, extensive research has been conducted to formulate glass compositions demonstrating melting and forming characteristics rendering them suitable for use in the mass production of lamp envelopes, while concurrently displaying the chemical and physical properties demanded for that application. Much of that research has centered upon glass compositions in the alkaline earth aluminosilicate system. Because tungsten-halogen lamp envelopes are most economically fabricated from sections of glass tubing, it would be most desirable for the glasses proposed for that application to display the thermal stability and viscosity parameters operable in the Vello high speed tube drawing process. Hence, such glasses will exhibit a viscosity at the liquidus of at least 50,000 poises and, preferably, in excess of 60,000 poises and a liquidus temperature no higher than 1130° C. The glasses must resist devitrification for relatively long periods of time when the glass is subjected to a temperature at or somewhat below its liquidus (thermal stability), the strain point of the glass will be at least 665° C., and the coefficient of thermal expansion (0°–300° C.) will be about $42-45 \times 10^{-7}/°C$.

SUMMARY OF THE INVENTION

In my research of glasses in the alkaline earth aluminosilicate field which might be suitable for use as envelopes for tungsten-halogen lamps, I observed that the substitution of barium for calcium and/or magnesium caused a significant lowering of the liquidus temperature without an accompanying reduction in glass viscosity. Unfortunately, barium additions cause the coefficient of thermal expansion of the glasses to rise. However, by carefully controlling the individual levels of the MgO-CaO-BaO matrix, it is possible to prepare glasses which will satisfy the above-described physical and chemical properties from compositions essentially free from alkali metal oxides which are generally encompassed within the base $MgO-CaO-BaO-Al_2O_3-B_2O_3-SiO_2$ system.

Another result emanating from my research in the field of alkaline earth aluminosilicate glasses was the discovery that additions of zinc, especially when made in substitution for calcium, will reduce the coefficient of thermal expansion of the glasses without seriously lowering the liquidus viscosities thereof. Consequently, through a careful combination of BaO and ZnO, the liquidus temperature of a glass can be reduced without concurrently seriously lowering the viscosity, thereby providing an improved liquidus-viscosity relationship, and the coefficient of thermal expansion can be maintained within a desired region. In so doing, the combination of BaO and ZnO provides more flexibility in varying the properties of the glass and yields a broader composition range of potentially acceptable glasses.

Because of the above-described, very stringent requirements with regard to thermal stability and viscosity which are placed upon glasses to be formed into tubing by the Vello process, and because of the high temperature operating conditions and critical sealing requirements of a tungsten-halogen lamp, only an extremely restricted regime of compositions within the base $MgO-CaO-BaO-Al_2O_3-B_2O_3-SiO_2$ system will be operable therefor. The addition of ZnO permits the base regime to be expanded slightly, thereby providing a little leeway to tailor the properties of the glasses.

In summary, glasses exhibiting a liquidus temperature no higher than 1125° C., a viscosity at the liquidus of at least 50,000 poises, excellent thermally stability, a strain point of at least 665° C., and a coefficient of thermal expansion (0°–300° C.) between about $42-46 \times 10^{-7}/°C$. can be prepared from compositions essentially free from alkali metal oxides and consisting essentially, expressed in terms of weight percent on the oxide basis, of:

$SiO_2$—56–59
$Al_2O_3$—16–17
$B_2O_3$—4.5–5.25
CaO—7.5–9.25
MgO—5.5–6.25
BaO—5–9

Where up to 4% by weight ZnO is included in the composition, the glasses consist essentially of $SiO_2$—54–59
$Al_2O_3$—15.5–17.5
$B_2O_3$—3.75–5.5
CaO—6–9.25
MgO—4–6.25
BaO—5–11
ZnO—up to 4

Because of the effect which ZnO has in lowering the strain point of the glasses, a maximum of about 4% can be tolerated.

In both composition regimes the total quantity of $SiO_2+Al_2O_3$ is important in fixing the values of viscosity, strain point, and coefficient to thermal expansion exhibited by the inventive compositions. For example, a low value of $SiO_2+Al_2O_3$ generally yields a glass displaying a low strain point. At the other extreme, excessively high levels of $SiO_2+Al_2O_3$ produce glasses of such high viscosity as to be difficult to melt. Therefore, the sum of $SiO_2+Al_2O_3$ will not exceed about 75%.

The weight ratio $SiO_2:Al_2O_3$ exerts a substantive effect upon the liquidus temperature demonstrated by the inventive glasses. Hence, where the liquidus temperature is too high, e.g., greater than about 1125° C., tube forming via the Vello process becomes very difficult. Accordingly, a weight ratio $SiO_2:Al_2O_3$ between about 3.1–3.7 is necessary.

The weight ratio CaO:MgO is of vital significance with respect to the expansion characteristics of the glasses. For example, in those instances where the ratio exceeds a specified limit, the coefficient of thermal expansion of the glasses will be too high and, conversely, where the ratio is below a certain minimum, not only will the compositions manifest coefficients of thermal expansion below the required limits, but also the liquidus temperature of the glass may be raised to an unworkable level. In view of those circumstances, the weight ratio CaO:MgO will be maintained between about 1.2–2.0.

$B_2O_3$ acts to impart a sufficiently low viscosity to the glass to effect easy melting, but without causing a significant increase in the coefficient of thermal expansion of the glass. $B_2O_3$ also tends to flatten the viscosity-temperature relationship demonstrated by the glass. Nonetheless, where the amount of $B_2O_3$ is too high, the strain point of the glass may fall to an undesirably low level. Conversely, below the specified minimum, the liquidus temperature rises to an unacceptable value.

Up to 3% SrO may optionally be added to the base composition, most likely in substitution for CaO. However, no significant improvement in glass properties has been observed.

For the most ideal lamp operation, the compositions will be essentially free from alkali metals, iron, and chloride. None of those materials will normally be purposely included in the glass batches.

The target composition for the most preferred glass, expressed in terms of weight percent on the oxide basis, is $Al_2O_3$—16.5±0.2
$B_2O_3$—4.8±0.1
CaO—7.8±0.1
MgO—5.8±0.1
BaO—8.25±0.1
$SiO_2$—Remainder and exhibits the following physical properties
Strain Point—670°
Coefficient of Thermal Expansion—$44 \times 10^{-7}/°C$.
Internal Liquidus—1100°
Liquidus Viscosity—$\sim 1 \times 10^5$ poises

PRIOR ART

U.S. Pat. No. 3,496,401 is directed to glasses explicitly formulated for use as envelopes for tungsten-iodine incandescent lamps. The glasses exhibit coefficients of thermal expansion of $30-50 \times 10^{-7}/°C$., demonstrate strain points in excess of 500° C., have liquidus viscosities of at least 5000 poises, and consist essentially, expressed in terms of weight percent on the oxide basis, of 55–70% $SiO_2$, 13–24% $Al_2O_3$, 10–25% alkaline earth metal oxide, and 0–10% $B_2O_3$. Alkali metal oxides will desirably be absent and, if present, the total will not exceed 0.1%.

Such broad composition ranges obviously overlap those of the present inventive glasses. However, the very breadth of the patented ranges differentiates that disclosure from the products of the instant invention. For example, the patent describes glasses having strain points in excess of 500° C., liquidus viscosities of at least 5000 poises, and coefficients of thermal expansion between $30-50 \times 10^{-7}/°C$. In contrast, the present inventive glasses exhibit strain points in excess of 665° C., liquidus viscosities of at least 50,000 poises, and coefficients of thermal expansion between about $42-46 \times 10^{-7}/°C$. Hence, the glasses of the instant invention are an improvement upon those of the patent. None of the glasses of the patent has a composition within the narrowly circumscribed limits such as to demonstrate the properties of the present inventive glasses. ZnO is nowhere mentioned in the patent.

U.S. Pat. No. 3,798,491 describes the fabrication of tungsten-halogen lamps having glass envelopes consisting essentially, in weight percent on the oxide basis, of 59–70% $SiO_2$, 10–20% $Al_2O_3$, and 7.4–28% BaO, which glass exhibits a coefficient of thermal expansion between $36-40 \times 10^{-7}/°C$. Nowhere are CaO, MgO, ZnO, and $B_2O_3$ mentioned and the coefficients of thermal expansion are lower than the minimum specified on the present inventive glasses.

U.S. Pat. No. 3,978,362 relates to glass especially suitable for use as envelopes for tungsten-bromine incandescent lamps. The glasses exhibit strain points in excess of 700° C., a liquids viscosity of at least 100,000 poises, a coefficient of thermal expansion between 48–55, and consist essentially, in weight percent on the oxide basis, of 58–63% $SiO_2$, 13–16% $Al_2O_3$, 14–21% CaO, 0–5% MgO, and 0–7% BaO, with the total CaO+MgO+BaO being at least 19%. The alkali metal oxides and $B_2O_3$ are preferably absent. It is immediately evident that the coefficients of thermal expansion of the patented glasses are higher than can be tolerated in the instant inventive glasses, the levels of CaO are outside of the ranges demanded in the inventive glasses, MgO and BaO are merely optional inclusions, $B_2O_3$ is preferably absent from the composition, and ZnO is nowhere mentioned.

U.S. Pat. No. 4,060,423 is concerned with glasses suitable for use in tungsten-halogen incandescent lamps wherein the glasses have liquidi no higher than 1250° C., strain points of at least 725° C., coefficients of thermal expansion between about $42-48 \times 10^{-7}/°C$., and consist essentially, in weight percent, of 55–68% $SiO_2$, 15–18% $Al_2O_3$, 6–13% CaO, and 6–16% BaO. MgO forms no part of the claimed composition, $B_2O_3$ is preferably absent therefrom, and ZnO is nowhere mentioned.

U.S. Pat. No. 4,255,198 relates to glasses designed for envelopes of tungsten-halogen lamps, those glasses exhibiting strain points higher than 730° C., liquidus tempratures below 1200° C., liquidus viscosities of at least 40,000 poises, coefficients of thermal expansion between $43-48 \times 10^{-7}/°C$., and consisting essentially, in weight percent on the oxide basis, of 61–65% $SiO_2$, 14–17% $Al_2O_3$, 8–15% CaO, 6–9% SrO, and 0–5% MgO and/or BaO. $B_2O_3$ forms no part of the compositions, the $SiO_2$ and SrO contents are outside the limits of the present inventive glasses, the inclusion of MgO is cautioned against because it reduces the strain point of the glasses and dramatically raises the liquidus temperatures thereof, and ZnO is nowhere mentioned.

U.S. Pat. No. 4,302,250 is directed to glasses suitable as envelopes for tungsten-halogen lamps, those glasses demonstrating strain points higher than 750° C., liquidus temperatures below 1300° C., liquidus viscosities of at least 40,000 poises, coefficients of thermal expansion between $42-44 \times 10^{-7}/°C$., and consisting essentially, in weight percent on the oxide basis, of 64–68% $SiO_2$, 11–14% CaO, 16.5–18.5% $Al_2O_3$, and 2–6.5% SrO+BaO, consisting of 0–4% SrO and 0–5% BaO. The levels of $SiO_2$ and CaO are beyond the limits of the instant inventive glasses, MgO and $B_2O_3$ comprise no part of the compositions, the liquidus values recorded are far above those illustrated by the present inventive glasses, and ZnO is nowhere mentioned.

European Patent Application No. 0019850, published Dec. 10, 1980 under the title "Halogen Incandescent Lamp", discusses glasses useful as envelopes for tungsten-halogen lamps, those glasses exhibiting strain points of at least 660° C., coefficients of thermal expansion between $41-48 \times 10^{-7}$/°C., and consisting essentially, in weight percent on the oxide basis, of 55-65% $SiO_2$, 15-22% $Al_2O_3$, 5-10% CaO, 6-10% MgO, and 3-6% $B_2O_3$ plus very small amounts of accompanying oxides, residual fluxes, and residual clarifying oxides. The single exemplary composition provided consisted of 57% $SiO_2$, 20% $Al_2O_3$, 6% CaO, 8% MgO, and 4% $B_2O_3$, the sum of those constituents totalling 95%. Neither BaO nor ZnO is mentioned in the specification.

U.K. Patent Application GB 2,060,602A, published May 7, 1981 under the title "Alkali-Free Sealing Glasses for Molybdenum", refers to glasses for the fabrication of tungsten-halogen lamp envelopes, those glasses manifesting transformation temperatures between 775°-810° C., the capability of being tinted via an addition of $CeO_2+TiO_2$ to the base composition, coefficients of thermal expansion between $46-51 \times 10^{-7}$/°C., and consisting essentially in weight percent on the oxide basis, of 57-64% $SiO_2$, 12.5-16.5% $Al_2O_3$, 1-5.5% $ZrO_2$, 15-19% $Al_2O_3+ZrO_2$, 11.5-19.2% CaO, 0-6.5% BaO, 0-8% $CeO_2$, 0-4.5% $TiO_2$, 18.6-25.7% $CaO+BaO+CeO_2+TiO_2$, and 0.3% $As_2O_3$. MgO, ZnO, and $B_2O_3$ comprise no part of the formal compositions and the CaO levels are beyond the limits of the instant inventive glasses.

DESCRIPTION OF PREFERRED EMBODIMENTS

The table below records a number of glass compositions, expressed in terms of weight percent on the oxide basis, which illustrate the critical compositional parameters that must be observed to produce glasses demonstrating the demanded physical properties. The actual batch ingredients may be any materials, either the oxides or other compounds, which, when melted together, will be converted into the desired oxide in the proper proportion. For example, $CaCO_3$ can be utilized as the source of CaO.

The batch materials were compounded, ballmilled together to aid in producing a homogeneous melt, the batch charged into a platinum crucible, which, after covering, was introduced into an electrically-heated furnace operating at 1600° C., and the batch melted for 16 hours. Thereafter, the crucible was removed from the furnace, the melt poured into a steel mold to form a glass slab having dimensions of about 6"×6", and this slab immediately transferred to an annealer operating at about 740° C. (Although the compositions reported in the table were melted in laboratory crucibles only, it must be appreciated that those compositions are amenable to melting in large scale commercial units.)

Also reported are measurements of several physical properties determined on the exemplary glasses in accordance with techniques conventional in the glass art. The strain (St.P.) and internal liquidus temperature (Liq.) are tabulated in terms of °C., the coefficient of thermal expansion (Exp.) measured over the range 0°-300° C. is listed in terms of $\times 10^{-7}$/°C., and the viscosity of the glass at the liquidus temperature (Vis.) is recorded in terms of poises.

TABLE

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $SiO_2$ | 57.2 | 57.9 | 57.4 | 58.2 | 57.7 | 54.8 | 54.5 | 54.5 | 56.1 | 58.8 | 58.3 | 57.8 | 54.1 | 57.1 | 55.2 | 54.9 | 59.1 |
| $Al_2O_3$ | 16.5 | 16.1 | 16.5 | 16.7 | 16.6 | 17.0 | 16.0 | 16.8 | 16.2 | 17.3 | 17.1 | 17.0 | 15.9 | 16.8 | 16.2 | 16.1 | 14.6 |
| $B_2O_3$ | 4.9 | 4.9 | 4.9 | 4.9 | 4.9 | 4.2 | 4.72 | 4.1 | 4.2 | 5.1 | 5.1 | 5.0 | 4.7 | 5.0 | 4.8 | 4.8 | 4.9 |
| CaO | 7.8 | 8.7 | 8.1 | 9.0 | 8.4 | 6.7 | 7.6 | 6.6 | 6.7 | 14.4 | 12.2 | 10.1 | 5.7 | 10.0 | 7.7 | 9.6 | 7.8 |
| MgO | 5.6 | 5.7 | 5.7 | 5.7 | 5.7 | 5.5 | 4.1 | 4.8 | 5.5 | 4.4 | 4.4 | 4.3 | 4.1 | 5.7 | 5.5 | 4.1 | 5.6 |
| BaO | 8.0 | 6.1 | 7.4 | 5.5 | 6.7 | 10.5 | 10.4 | 10.4 | 9.2 | — | — | — | 15.5 | 5.4 | 10.6 | 10.5 | 8.0 |
| ZnO | — | — | — | — | — | 1.3 | 2.78 | 2.8 | 2.1 | — | 2.9 | 5.8 | — | — | — | — | — |
| St. P. | 672 | 673 | 670 | 672 | 675 | 678 | 669 | 672 | 674 | 672 | 672 | 666 | 670 | 672 | 669 | 664 | 670 |
| Exp. | 44.4 | 43.3 | 44.7 | 42.9 | 44.7 | 44.6 | 44.1 | 43.8 | 44.2 | 47.6 | 45.1 | 41.7 | 46.9 | 45.0 | 46.7 | 49.3 | 43.0 |
| Liq. | 1081 | 1091 | 1095 | 1109 | 1104 | 1112 | 1086 | 1112 | 1082 | 1191 | 1159 | 1225 | 1183 | 1129 | 1085 | 1110 | 1172 |
| Vis. | $1.8 \times 10^5$ | — | — | — | — | $1.5 \times 10^5$ | $1.2 \times 10^5$ | — | — | | | | | | | | |

As can be observed, Examples 1-9 exhibit the desired properties whereas Examples 10-17, having compositions similar to those of Examples 1-9, but outside of the above-specified ranges of components, do not. To illustrate, Example 10 reflects the high CaO, aluminosilicate glasses of the prior art exhibiting a high liquidus temperature and coefficient of thermal expansion. Examples 11 and 12 demonstrate that small substitutions of ZnO for CaO will reduce the liquidus temperature slightly, but larger additions exert an opposite effect. Examples 13-17 show how carefully the ranges of $SiO_2$, $Al_2O_3$, $B_2O_3$, CaO, MgO, and BaO must be controlled in order to produce glasses having the required properties.

I claim:

1. A glass exhibiting a strain point in excess of 665° C., a liquidus temperature no higher than 1125° C., a viscosity at the liquidus of at least 50,000 poises, and a coefficient of thermal expansion (0°-300° C.) between about $42-46 \times 10^{-7}$/°C., said glass consisting essentially, expressed in terms of weight percent on the oxide basis, of $SiO_2$—56-59
  $Al_2O_3$—16-17
  $B_2O_3$—4.5-5.25
  CaO—7.5-9.25
  MgO—5.5-6.25
  BaO—5-9 wherein the sum $SiO_2+Al_2O_3$ will not exceed about 75%, the weight ratio $SiO_2:Al_2O_3$ is maintained between about 3.1-3.7, and the weight ratio CaO:MgO is held between about 1.2-2.0.

2. A glass according to claim 1 also containing up to 3% SrO.

3. A glass exhibiting a strain point in excess of 665° C., a liquidus temperature no higher than 1125° C., a viscosity at the liquidus of at least 50,000 poises, and a coefficient of thermal expansion (0°-300° C.) between about $42-46 \times 10^{-7}$/°C., said glass consisting essentially, expressed in weight percent on the oxide basis, of $SiO_2$—54-59

$Al_2O_3$—15.5–17.5
$B_2O_3$—3.75–5.5
CaO—6–9.25
MgO—4–6.25
BaO—5–11
ZnO—up to 4
wherein the sum $SiO_2+Al_2O_3$ will not exceed about 75%, the weight ratio $SiO_2:Al_2O_3$ is maintained about 3.1–3.7, and the weight ratio CaO:MgO is held between about 1.2–2.0.

4. A glass according to claim 3 also containing up to 3% SrO.